(12) United States Patent
Hakoi et al.

(10) Patent No.: US 10,180,594 B2
(45) Date of Patent: Jan. 15, 2019

(54) MIRROR DISPLAY

(71) Applicant: Sharp Kabushiki Kaisha, Sakai, Osaka (JP)

(72) Inventors: Hiroyuki Hakoi, Sakai (JP); Masahiro Hasegawa, Sakai (JP); Akira Sakai, Sakai (JP); Kiyoshi Minoura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 52 days.

(21) Appl. No.: 15/306,791

(22) PCT Filed: Apr. 21, 2015

(86) PCT No.: PCT/JP2015/062031
§ 371 (c)(1),
(2) Date: Oct. 26, 2016

(87) PCT Pub. No.: WO2015/166833
PCT Pub. Date: Nov. 5, 2015

(65) Prior Publication Data
US 2017/0059935 A1    Mar. 2, 2017

(30) Foreign Application Priority Data
Apr. 28, 2014   (JP) .................... 2014-092838

(51) Int. Cl.
*G02F 1/1335* (2006.01)
*G02B 5/30* (2006.01)
(Continued)

(52) U.S. Cl.
CPC ..... *G02F 1/133536* (2013.01); *G02B 5/3033* (2013.01); *G02B 5/3041* (2013.01);
(Continued)

(58) Field of Classification Search
CPC ......... G02F 1/133536; G02F 1/133555; G02F 2001/133557; G02F 2001/133562;
(Continued)

(56) References Cited

U.S. PATENT DOCUMENTS

| 2004/0051827 A1 | 3/2004 | Hinata et al. |
| 2007/0211344 A1 | 9/2007 | Setoguchi |

(Continued)

FOREIGN PATENT DOCUMENTS

| JP | 2004-085590 A | 3/2004 |
| JP | 2004-125886 A | 4/2004 |
| JP | 2007-241017 A | 9/2007 |

OTHER PUBLICATIONS

Official Communication issued in International Patent Application No. PCT/JP2015/062031, dated Jul. 7, 2015.

*Primary Examiner* — Angela K Davison
(74) *Attorney, Agent, or Firm* — Keating & Bennett, LLP (57) ABSTRACT

The present invention provides a mirror display that can suppress warp of a half mirror plate with a reflective polarizer under heat to prevent distortion of a reflected image in a mirror mode. The mirror display of the present invention includes a half mirror plate that includes a first reflective polarizer and a first base material, a display device, and a warp-suppressing member that suppresses shrinking of the first reflective polarizer under heat. The first reflective polarizer and the first base material are integrated, and the display device is disposed on the back surface side of the half mirror plate.

8 Claims, 5 Drawing Sheets

(51) Int. Cl.
*G02B 7/00* (2006.01)
*G09F 9/35* (2006.01)

(52) U.S. Cl.
CPC ....... *G02B 7/008* (2013.01); *G02F 1/133555* (2013.01); *G09F 9/35* (2013.01); *G02F 2001/133557* (2013.01); *G02F 2001/133562* (2013.01); *G02F 2201/54* (2013.01); *G02F 2203/09* (2013.01)

(58) Field of Classification Search
CPC ............. G02F 2201/54; G02F 2203/09; G02B 5/3033; G02B 5/3041
See application file for complete search history.

(56) References Cited

U.S. PATENT DOCUMENTS

2008/0151372 A1\* 6/2008 Ouderkirk ............... B32B 33/00
  359/485.04
2008/0309852 A1\* 12/2008 O'Donnell ........ G02F 1/133536
  349/74
2014/0132897 A1\* 5/2014 Oya ...................... G02B 5/305
  349/96

\* cited by examiner

MIRROR DISPLAY

TECHNICAL FIELD

The present invention relates to a mirror display. The present invention specifically relates to a mirror display that provides both a mirror mode serving as a mirror and a display mode providing an image.

BACKGROUND ART

Mirror displays, which can serve as a mirror in a non-display state by using a half mirror plate with a half mirror layer provided on the viewing surface side of a display device, have been recently proposed for applications such as digital signage (e.g. Patent Literature 1). A mirror display is usable as a mirror in addition to as a display which is the original purpose. Specifically, when display light is emitted from the display device, the mirror display shows an image owing to the display light in a region where the display light is emitted from the display device. When no display light is emitted from the display device, on the other hand, the mirror display reflects the outside light and serves as a mirror in a region where the display light is not emitted from the display device.

Known examples of the half mirror layer include a reflective polarizer. A reflective polarizer reflects, among incident light components, a polarized light component parallel to the reflection axis of the polarizer and transmits a polarized light component perpendicular to the reflection axis thereof. The reflective polarizer accordingly can transmit a light component emitted from the display device to the viewing surface side as display light and can reflect an outside light component perpendicular to the polarization direction of the display light to the viewing surface side. A mirror display including a reflective polarizer as a half mirror layer switches the display mode and the mirror mode using such a principle.

In such a mirror display, when a reflective polarizer is bonded to a polarizer disposed on the viewing surface side of a liquid crystal display panel, for example, the flatness (irregularities) on the surface of the polarizer may cause distortion of a reflected image in a mirror mode. For solving this problem, a configuration has been proposed in which a reflective polarizer is bonded to a base material that is separately provided on the viewing surface side of a display device (e.g. Patent Literatures 1 and 2).

CITATION LIST

Patent Literature

Patent Literature 1: JP 3726900 B
Patent Literature 2: JP 2004-125886 A

SUMMARY OF INVENTION

Technical Problem

Conventional half mirror plates have a configuration including a reflective polarizer bonded to only one side of a base material. The reflective polarizer shrinks under heat, and thereby warps the half mirror plate, unfortunately. As a result, a reflected image in the mirror mode may be distorted. The following are specific examples causing warp of the half mirror plate.

In a mirror display that includes a liquid crystal display device as a display device, the backlight unit generates heat to increase the surface temperature of the liquid crystal display panel in the liquid crystal display device to 40° C. to 50° C. The liquid crystal display panel in turn heats the half mirror plate disposed on the viewing surface side of the liquid crystal display panel. Meanwhile, a mirror display for outdoor digital signage usually undergoes waterproof treatment to improve the airtightness in the mirror display and thus tends to inhibit escape of heat. The temperature in the mirror display therefore reaches 50° C. or higher under direct sunlight, which heats the half mirror plate at even higher temperatures. Thus, the reflective polarizer heated under such environments may shrink to warp the half mirror plate.

Patent Literatures 1 and 2 each disclose achievement of improved display quality and decreased thickness and weight of the entire device in a display device that can switch the display mode and the mirror mode. The mirror displays disclosed in Patent Literatures 1 and 2 have a configuration including a reflective polarizer bonded to only one side of a base material. Thus, the reflective polarizer shrinking under heat warps the half mirror plate and resultantly causes a distorted reflected image in the mirror mode, unfortunately. Still, there is room for improvement.

The present invention was made under the current situation as above, and aims to provide a mirror display that can suppress warp of a half mirror plate with a reflective polarizer under heat to prevent distortion of a reflected image in a mirror mode.

Solution to Problem

The present inventors made intensive studies about a mirror display that can suppress warp of a half mirror plate with a reflective polarizer under heat to prevent distortion of a reflected image in a mirror mode, and focused on a configuration that can suppress shrinking of the reflective polarizer under heat. Then, they found a solution of providing a warp-suppressing member. This finding led them to a fine solution to the above problem and achievement of the present invention.

Specifically, an aspect of the present invention may be a mirror display including a half mirror plate that includes a first reflective polarizer and a first base material, a display device, and a warp-suppressing member that suppresses shrinking of the first reflective polarizer under heat, the first reflective polarizer and the first base material being integrated, the display device being disposed on the back surface side of the half mirror plate.

Advantageous Effects of Invention

The present invention can provide a mirror display that can suppress warp of a half mirror plate with a reflective polarizer under heat to prevent distortion of a reflected image in a mirror mode.

DESCRIPTION OF EMBODIMENTS

The present invention will be described in detail below by way of, but not limited to, the following examples referring to the drawings. The configurations of the respective examples may be employed in appropriate combination or may be modified as long as the combination or the modification is not beyond the spirit of the present invention.

Although the following examples describe the case where a liquid crystal display device is used as a display device, the kind of the display device is not particularly limited. Display devices such as a plasma display device, an organic electroluminescence display device, and an inorganic electroluminescence display device may also be used.

The heat shrinkage of each member was determined alone, i.e., in the state separated from the mirror display, by measuring the length of the member stored at room temperature (25° C.) before heat shrinking and the length of the member after heat shrinking under heat and calculating the shrinkage according to the equation: heat shrinkage (%)= [(length after heat shrinking−length before heat shrinking)/ length before heat shrinking]×100. Heating for heat shrinking was performed by allowing the member to stand in a constant-temperature bath at 85° C. for 24 hours. Comparison in heat shrinkage between the different members was made using values obtained from same-sized samples.

Example 1

Example 1 relates to a mirror display that includes a liquid crystal display device, a reflective polarizer as a half mirror layer, and a heat-shrinkable member as a warp-suppressing member.

Figure 1:
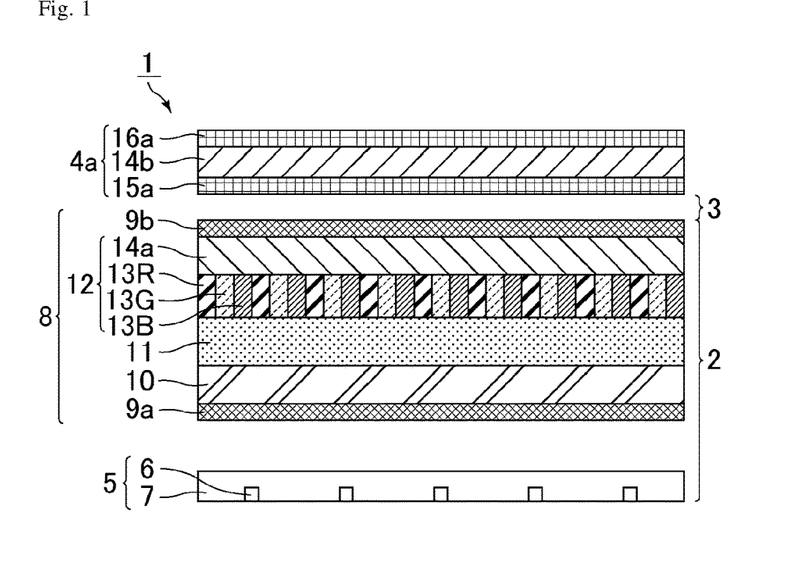
FIG. 1 is a schematic cross-sectional view of a mirror display of Example 1.

FIG. 1 is a schematic cross-sectional view of a mirror display of Example 1. As shown in FIG. 1, a mirror display 1 includes, in the order from the back surface side toward the viewing surface side, a liquid crystal display device 2, an air layer 3, and a half mirror plate 4a. The liquid crystal display device 2 and the half mirror plate 4a were fixed by fitting the upper and lower edges of the half mirror plate 4a to a pair of aluminum rails which are attached to the upper and lower edges of the liquid crystal display device 2 so as to form a frame-like structure. The air layer 3 is the space formed in a slight gap between the liquid crystal display device 2 and the half mirror plate 4a. The term "viewing surface" as used herein refers to the surface of the mirror display on the half mirror plate side, and the term "viewing surface side" as used herein refers to the upper side of the mirror display 1 in FIG. 1. The term "back surface" as used herein refers to the surface opposite to the viewing surface of the mirror display, and the term "back surface side" as used herein refers to the lower side of the mirror display 1 in FIG. 1. The same shall apply to each example.

The liquid crystal display device 2 includes, in the order from the back surface side toward the viewing surface side, a backlight unit 5 and a liquid crystal display panel 8.

The backlight unit 5, including light emitting diodes (LEDs) 6 as a display light source and a diffuser 7 disposed to cover the LEDs 6, is of a direct type. The type of the backlight unit is not particularly limited, and an edge-light type backlight unit may be employed in which a display light source is disposed adjacent to an edge of a light guide plate.

The liquid crystal display panel 8 includes, in the order from the back surface side toward the viewing surface side, an absorptive polarizer 9a, a thin film transistor array substrate 10, a liquid crystal layer 11, a color filter substrate 12, and an absorptive polarizer 9b.

The thin film transistor array substrate 10 has a configuration including, on a glass substrate, members such as parallel gate signal lines, parallel source signal lines extending in the direction perpendicular to the gate signal lines, thin film transistors each disposed at an intersection of a gate signal line and a source signal line, and pixel electrodes (not shown) arranged in a matrix in regions divided by the gate signal lines and the source signal lines. The glass substrate may be replaced by a transparent substrate such as a plastic substrate.

The color filter substrate 12 includes a glass substrate 14a, a black matrix (not shown) with a grid pattern disposed on the glass substrate 14a on the side of the thin film transistor array substrate 10, color filter layers 13R (red), 13G (green), and 13B (blue) disposed in regions divided by the black matrix, and a common electrode (not shown) formed to cover the black matrix and the color filter layers. The glass substrate 14a may be replaced by a transparent substrate such as a plastic substrate. The combination of the colors in the color filter layers is not particularly limited, and may be a combination of red, green, blue, and yellow, for example. Examples of the material for forming the pixel electrodes and the common electrode include transparent conductive materials such as indium tin oxide (ITO) and indium zinc oxide (IZO).

The liquid crystal layer 11 is interposed between the thin film transistor array substrate 10 and the color filter substrate 12. The thin film transistor array substrate 10 and the color filter substrate 12 were bonded to each other with a sealing material (not shown) in between. An alignment film (not shown) is disposed on each of the thin film transistor array substrate 10 on the liquid crystal layer 11 side and the outermost surface of the color filter substrate 12 on the liquid crystal layer 11 side.

The absorptive polarizer 9a was bonded to the back surface side of the thin film transistor array substrate 10 with an adhesive (not shown) in between. The absorptive polarizer 9b was bonded to the viewing surface side of the color filter substrate 12 with an adhesive (not shown) in between. The absorptive polarizers 9a and 9b were arranged such that the absorption axes of the respective polarizers were perpendicular to each other.

Figure 2:
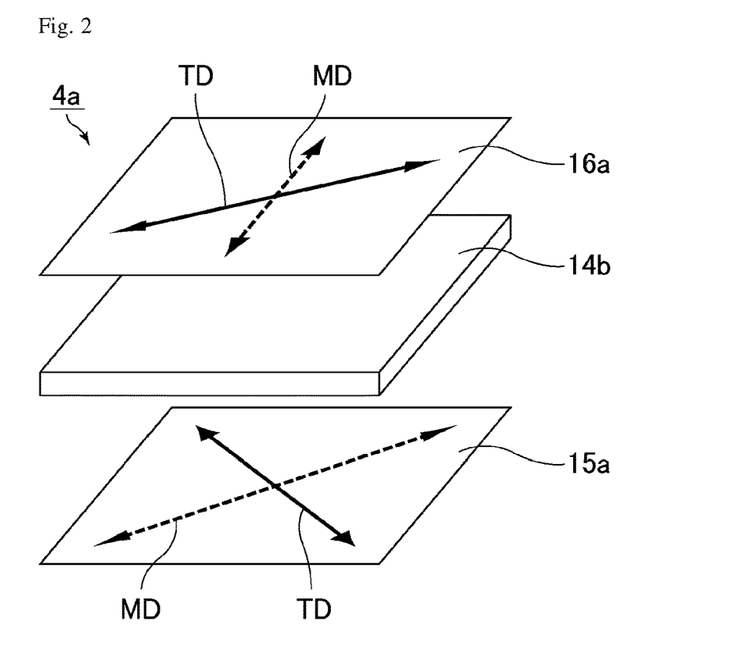
FIG. 2 is a schematic perspective view of a half mirror plate of Example 1.

Next, the half mirror plate 4a is described additionally referring to FIG. 2. FIG. 2 is a schematic perspective view of a half mirror plate of Example 1. The half mirror plate 4a includes, in the order from the back surface side toward the viewing surface side, a reflective polarizer 15a as a half mirror layer (first reflective polarizer), a glass substrate 14b (first base material) as a base material supporting the half mirror layer, and a heat-shrinkable member 16a as a warp-suppressing member. The respective members are shown separately from each other for convenience in FIG. 2 but were in fact bonded to each other with an adhesive (trade name: PD-S1, not shown, available from Panac Co., Ltd.) in between. The reflective polarizer 15a and the absorptive polarizer 9b were arranged such that the transmission axes of the respective polarizers were parallel to each other.

For the glass substrate 14b, a non-alkali glass substrate (trade name: EAGLE XG, available from Corning Incorporated) having a 20-inch size (249 mm×443 mm) and a thickness of 0.7 mm was used. The base material (first base material) supporting the half mirror layer is suitably made of glass having a high transparency and a low coefficient of thermal expansion. Examples thereof include soda-lime glass, borosilicate glass, and silica glass in addition to the non-alkali glass as used in the present example. In terms of achieving sufficient effects of the present invention, the base material has a coefficient of thermal expansion of preferably not higher than $10 \times 10^{-6}/°$ C., more preferably not higher than $5 \times 10^{-6}/°$ C.

For the reflective polarizer 15a, a multilayer reflective polarizer (trade name: DBEF, available from Sumitomo 3M Ltd.) having the same size as the glass substrate 14b was used. The reflective polarizer may be a reflective polarizer including cholesteric liquid crystals and a λ/4 plate or a wire grid reflective polarizer. Examples of the reflective polarizer including cholesteric liquid crystals and a λ/4 plate include a reflective polarizer (trade name: NIPOCS) available from Nitto Denko Corporation. In the case of using a reflective polarizer other than the multilayer reflective polarizer as used in the present example, the heat-shrinkable member 16a should be appropriately disposed upon confirming the direction with a higher heat shrinkage of the reflective polarizer. The reflective polarizer 15a had a heat shrinkage in the machine direction (MD) of 0.3% and a heat shrinkage in the direction perpendicular to the MD (i.e. transverse direction (TD)) of 0%. The machine direction (MD) refers to the flow direction of a resin when a film is molded.

For the heat-shrinkable member 16a, a polyethylene terephthalate (PET) film (trade name: Cosmoshine® A4100, available from Toyobo Co., Ltd.) having the same size as the glass substrate 14b was used. The heat-shrinkable member may be any heat-shrinkable member that has a high transparency and anisotropic heat shrinkage. Examples thereof include a polyethylene 2,6-naphthalate (PEN) film and a cycloolefin polymer (COP) film. The heat-shrinkable member 16a had a heat shrinkage in the MD of 0.1% and a heat shrinkage in the TD of 0%. In terms of achieving sufficient effects of the present invention, the heat-shrinkable member 16a has a heat shrinkage in the MD of preferably 0.1% or higher but 0.3% or lower, and a heat shrinkage in the TD of preferably 0%.

The MD and TD of the reflective polarizer 15a and the MD and TD of the heat-shrinkable member 16a are as shown in FIG. 2, and the angle formed by the respective MDs was set to 45°.

In the mirror display of Example 1, the reflective polarizer 15a and the heat-shrinkable member 16a heat-shrink to pull the glass substrate 14b away from each other, thereby suppress warp of the half mirror plate 4a under heat, and can resultantly prevent distortion of a reflected image in the mirror mode.

Example 1 employed a half mirror plate with the configuration as shown in FIG. 2. As a modified example of Example 1, a half mirror plate that includes, in the order from the back surface side toward the viewing surface side, the heat-shrinkable member 16a, the glass substrate 14b, and the reflective polarizer 15a may be employed. From the viewpoint of preventing the phase difference caused by the heat-shrinkable member 16a from affecting light emitted from the liquid crystal display device 2, the half mirror plate preferably has a configuration in which the heat-shrinkable member is disposed closer to the viewing surface side than the reflective polarizer, as shown in FIG. 2.

Example 2

Example 2 relates to a mirror display that includes a liquid crystal display device, a reflective polarizer as a half mirror layer, and a heat-shrinkable member as a warp-suppressing member. The difference from Example 1 is the arrangement of the MDs (TDs) of the reflective polarizer and the heat-shrinkable member. Since the mirror display of Example 2 is the same as the mirror display of Example 1 except for the above configuration, the explanation of the same respects is omitted here.

Figure 3:
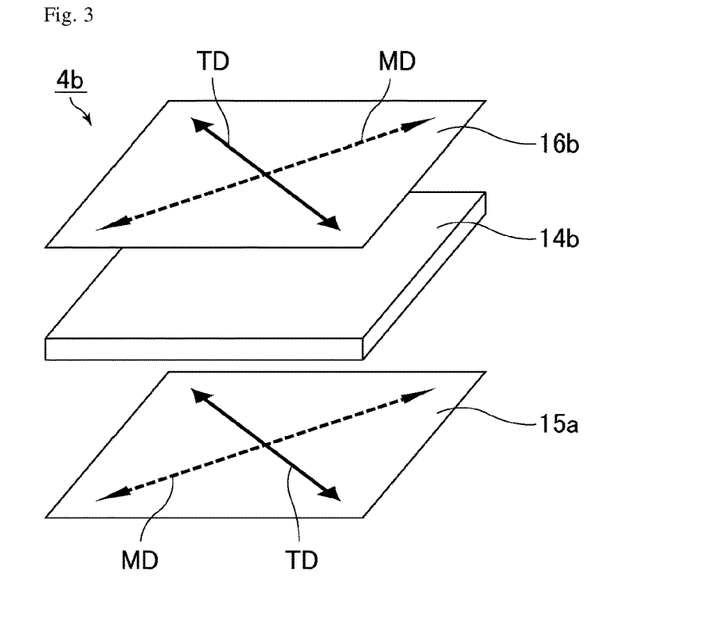
FIG. 3 is a schematic perspective view of a half mirror plate of Example 2.

FIG. 3 is a schematic perspective view of a half mirror plate of Example 2. As shown in FIG. 3, a half mirror plate 4b includes, in the order from the back surface side toward the viewing surface side, the reflective polarizer 15a as a half mirror layer, the glass substrate 14b as a base material supporting the half mirror layer, and a heat-shrinkable member 16b as a warp-suppressing member. The respective members were bonded to each other with an adhesive (trade name: PD-S1, not shown, available from Panac Co., Ltd.) in between.

For the heat-shrinkable member 16b, a PET film (trade name: Cosmoshine® A4100, available from Toyobo Co., Ltd.) having the same size as the glass substrate 14b was used.

The reflective polarizer 15a had a heat shrinkage in the MD of 0.3% that was higher than the heat shrinkage in the TD of 0%. The heat-shrinkable member 16b had a heat shrinkage in the MD of 0.1% that was higher than the heat shrinkage in the TD of 0%. As mentioned above, the heat shrinkage in the MD of the heat-shrinkable member 16b was set to be lower than the heat shrinkage in the MD of the reflective polarizer 15a. In terms of suppressing warp of the half mirror plate 4b resulting from heat shrinking of the reflective polarizer 15a, the heat-shrinkable member 16b needs to have a heat shrinkage in the MD equal to or lower than the heat shrinkage in the MD of the reflective polarizer 15a. The difference in heat shrinkage in the MD between the heat-shrinkable member 16b and the reflective polarizer 15a is preferably 0.2% or lower. If the difference in heat shrinkage in the MD between the respective members is 0.2% or lower, the effects of the present invention can be sufficiently achieved. More preferably, the heat shrinkage in the MD of the heat-shrinkable member 16b is set to the same as the heat shrinkage in the MD of the reflective polarizer 15a.

The MD and TD of the reflective polarizer 15a and the MD and TD of the heat-shrinkable member 16b are as shown in FIG. 3. The MD (the first direction) of the reflective polarizer 15a and the MD (the second direction) of the heat-shrinkable member 16b were substantially parallel to each other. The phrase that two directions are substantially parallel to each other as used herein means that the angle formed by two directions is 1° or less.

In the mirror display of Example 2, the reflective polarizer 15a and the heat-shrinkable member 16b heat-shrink to pull the glass substrate 14b away from each other, and thereby can suppress warp of the half mirror plate 4b under heat. In addition, arranging the reflective polarizer 15a and the heat-shrinkable member 16b such that the directions in which the respective members each have a higher heat shrinkage are substantially parallel to each other can more effectively suppress warp of the half mirror plate 4b and can resultantly prevent distortion of a reflected image in the mirror mode.

Example 2 employed the configuration in which the reflective polarizer 15a and the heat-shrinkable member 16b each had a higher heat shrinkage in the MD than in the TD. Here, as a modified example of Example 2, a configuration in which the reflective polarizer 15a and the heat-shrinkable member 16b each have a lower heat shrinkage in the MD than in the TD may be employed. In this case, similar effects to Example 2 can be achieved by setting the heat shrinkage in the TD of the heat-shrinkable member 16b equal to or lower than the heat shrinkage in the TD of the reflective polarizer 15a and arranging the TD of the reflective polarizer 15a and the TD of the heat-shrinkable member 16b substantially parallel to each other.

Example 3

Example 3 relates to a mirror display that includes a liquid crystal display device, a reflective polarizer as a half mirror layer, and a reflective polarizer as a warp-suppressing member. The difference from Example 1 is use of the reflective polarizer as a warp-suppressing member instead of the heat-shrinkable member. Since the mirror display of Example 3 is the same as the mirror display of Example 1 except for the above configuration, the explanation of the same respects is omitted here.

Figure 4:
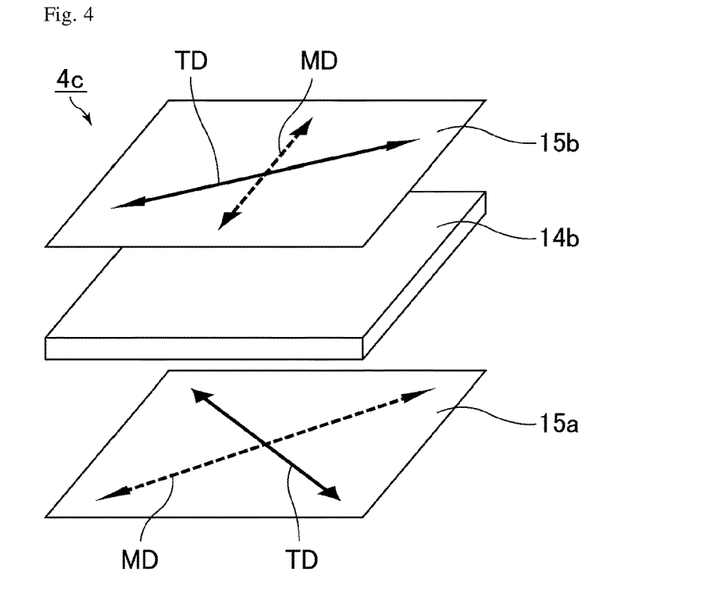
FIG. 4 is a schematic perspective view of a half mirror plate of Example 3.

FIG. 4 is a schematic perspective view of a half mirror plate of Example 3. As shown in FIG. 4, a half mirror plate 4c includes, in the order from the back surface side toward the viewing surface side, the reflective polarizer 15a as a half mirror layer, the glass substrate 14b as a base material supporting the half mirror layer, and a reflective polarizer 15b (second reflective polarizer) as a warp-suppressing member. The respective members were bonded to each other with an adhesive (trade name: PD-S1, not shown, available from Panac Co., Ltd.) in between.

For the reflective polarizer 15b, a multilayer reflective polarizer (trade name: DBEF, available from Sumitomo 3M Ltd.) made of the same material and having the same thickness and size as the reflective polarizer 15a was used. The reflective polarizer may be a reflective polarizer including cholesteric liquid crystals and a λ/4 plate or a wire grid reflective polarizer. Although two identical reflective polarizers are used in the present example, two reflective polarizers with different compositions (e.g. component contents) may be used as long as they have similar thicknesses and similar heat shrinkages. The phrase two reflective polarizers have the same thickness as used herein means that the difference between the two thicknesses is 0.005 mm or less. The phrase two reflective polarizers have similar heat shrinkages as used herein means that the difference between the heat shrinkages in the MD (or the TD) of the two polarizers is 0.015% or less.

The MD and TD of the reflective polarizer 15a and the MD and TD of the reflective polarizer 15b are as shown in FIG. 4, and the angle formed by the respective MDs was set to 45°. The angle formed by the MDs of the two reflective polarizers is not particularly limited as long as it is 0° or greater but less than 90°. Here, the MDs of the reflective polarizers are each along the transmission axis. If the angle formed by the MDs of the two reflective polarizers is 90°, the transmission axes of the respective polarizers are perpendicular to each other. Thus, light emitted from the liquid crystal display device 2 cannot be transmitted to the viewing surface side as display light. Accordingly, the angle formed by the MDs of the two reflective polarizers is preferably less than 90°. Furthermore, from the viewpoint of transmitting light emitted from the liquid crystal display device 2 to the viewing surface side with a minimum loss, the angle formed by the MD of the reflective polarizer 15a and the MD of the reflective polarizer 15b is more preferably 0°. The case where the angle formed by the respective MDs is 0° will be described in the below Example 4. The TDs of the reflective polarizers are each along the reflection axis. In terms of enhancing the reflectance for outside light to improve the display quality in the mirror mode, the angle formed by the TD of the reflective polarizer 15a and the TD of the reflective polarizer 15b is preferably greater than 0°.

In the mirror display of Example 3, the reflective polarizer 15a and the reflective polarizer 15b heat-shrink to pull the glass substrate 14b away from each other, and thereby can suppress warp of the half mirror plate 4c under heat. In addition, since the reflective polarizer 15a and the reflective polarizer 15b were made of the same material and had the same thickness, the respective polarizers have the same heat shrinkage and thus can more effectively suppress warp of the half mirror plate 4c. As a result, distortion of a reflected image in the mirror mode can be prevented.

Example 4

Example 4 relates to a mirror display that includes a liquid crystal display device, a reflective polarizer as a half mirror layer, and a reflective polarizer as a warp-suppressing member. The difference from Example 3 is the arrangement of the MDs (TDs) of the two reflective polarizers. Since the mirror display of Example 4 is the same as the mirror display of Example 3 except for the above configuration, the explanation of the same respects is omitted here.

Figure 5:
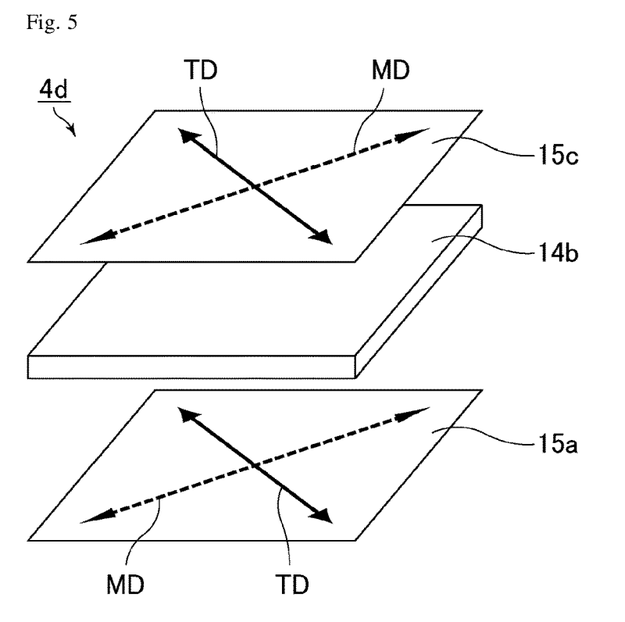
FIG. 5 is a schematic perspective view of a half mirror plate of Example 4.

FIG. 5 is a schematic perspective view of a half mirror plate of Example 4. As shown in FIG. 5, a half mirror plate 4d includes, in the order from the back surface side toward the viewing surface side, the reflective polarizer 15a as a half mirror layer, the glass substrate 14b as a base material supporting the half mirror layer, and a reflective polarizer 15c (second reflective polarizer) as a warp-suppressing member. The respective members were bonded to each other with an adhesive (trade name: PD-S1, not shown, available from Panac Co., Ltd.) in between.

For the reflective polarizer 15c, a multilayer reflective polarizer (trade name: DBEF, available from Sumitomo 3M Ltd.) made of the same material and having the same thickness and size as the reflective polarizer 15a was used.

The MD and TD of the reflective polarizer 15a and the MD and TD of the reflective polarizer 15c are as shown in FIG. 5, and the MDs of the respective polarizers were made parallel to each other. The angle formed by the reflection axis of the reflective polarizer 15a and the reflection axis of the reflective polarizer 15c was 0'.

In the mirror display of Example 4, the reflective polarizer 15a and the reflective polarizer 15c heat-shrink to pull the glass substrate 14b away from each other, and thereby can suppress warp of the half mirror plate 4d under heat. In addition, since the reflective polarizer 15a and the reflective polarizer 15c were made of the same material, had the same thickness, and were arranged such that the directions of heat shrinking were the same, the respective polarizers can pull the glass substrate 14b with identical strengths to perfectly prevent warp of the half mirror plate 4d. As a result, distortion of a reflected image in the mirror mode can be prevented.

Example 5

Example 5 relates to a mirror display that includes a liquid crystal display device, a reflective polarizer as a half mirror layer, and a base material as a warp-suppressing member. The difference from Example 1 is use of the base material as a warp-suppressing member instead of the heat-shrinkable member. Since the mirror display of Example 5 is the same as the mirror display of Example 1 except for the above configuration, the explanation of the same respects is omitted here.

Figure 6:
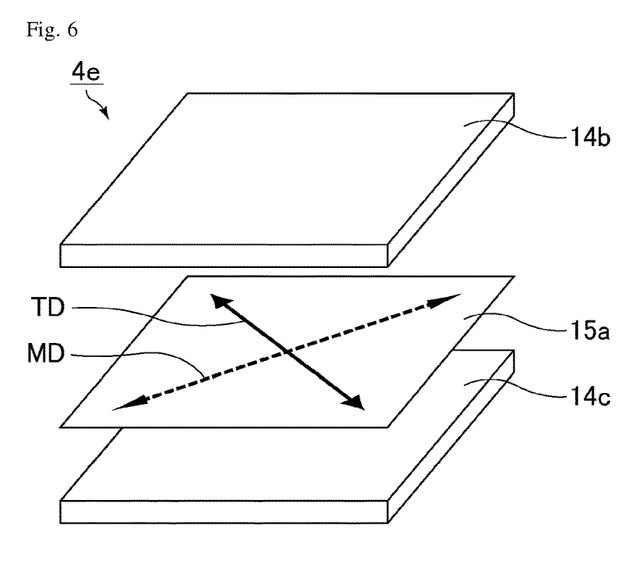
FIG. 6 is a schematic perspective view of a half mirror plate of Example 5.

FIG. 6 is a schematic perspective view of a half mirror plate of Example 5. As shown in FIG. 6, a half mirror plate 4e includes, in the order from the back surface side toward the viewing surface side, a glass substrate 14c (second base material) as a warp-suppressing member, the reflective polarizer 15a as a half mirror layer, and the glass substrate 14b as a base material supporting the half mirror layer. The respective members were bonded to each other with an adhesive (trade name: PD-S1, not shown, available from Panac Co., Ltd.) in between.

For the glass substrate 14c, a non-alkali glass substrate (trade name: EAGLE XG, available from Corning Incorporated) made of the same material and having the same thickness and size as the glass substrate 14b was used. The glass substrates 14b and 14c are preferably made of glass having high transparency in terms of achieving good display, and are preferably made of glass having a low coefficient of thermal expansion in terms of achieving good dimensional stability. In addition to non-alkali glass as used in this example, glasses such as soda-lime glass, borosilicate glass, and silica glass may also be used. The thickness of the glass substrates 14b and 14c may be appropriately adjusted according to use. In terms of reducing the thickness and weight, a glass substrate with a thickness of 0.7 mm or less may be used for mobile applications, for example. The two glass substrates (first and second base materials) may have different compositions (e.g. component contents) as long as they have similar coefficients of thermal expansion. The two glass substrates may have different thicknesses as long as they have similar coefficients of thermal expansion. The phrase that two glass substrates have the same thickness as used herein means that the difference in thickness between the two glass substrates is 0.1 mm or less. The phrase that two glass substrates have similar coefficients of thermal expansion as used herein means that the difference in coefficient of thermal expansion between the two glass substrates is $1\times10^{-6}/°$ C. or less.

In the mirror display of Example 5, a symmetrical structure in which the reflective polarizer 15a is interposed between the glass substrates 14b and 14c is achieved, thereby perfectly prevents warp of the half mirror plate 4e under heat, and can resultantly prevent distortion of a reflected image in the mirror mode.

Example 5 employed the configuration in which the glass substrate 14b and the glass substrate 14c were made of the same material and had the same thickness. As a modified example of Example 5, a configuration in which the glass substrate 14b and the glass substrate 14c made of different materials and having different thicknesses may be employed. In terms of more effectively suppressing warp of the half mirror plate under heat, the glass substrate 14b and the glass substrate 14c are preferred to be made of the same material and to have the same thickness.

Example 6

Example 6 relates to a mirror display that includes a liquid crystal display device, a reflective polarizer as a half mirror layer, and a stack of a reflective polarizer and a base material as a warp-suppressing member. The difference from Example 5 is use of the stack of a reflective polarizer and a base material as a warp-suppressing member instead of the base material. Since the mirror display of Example 6 is the same as the mirror display of Example 5 except for the above configuration, the explanation of the same respects is omitted here.

Figure 7:
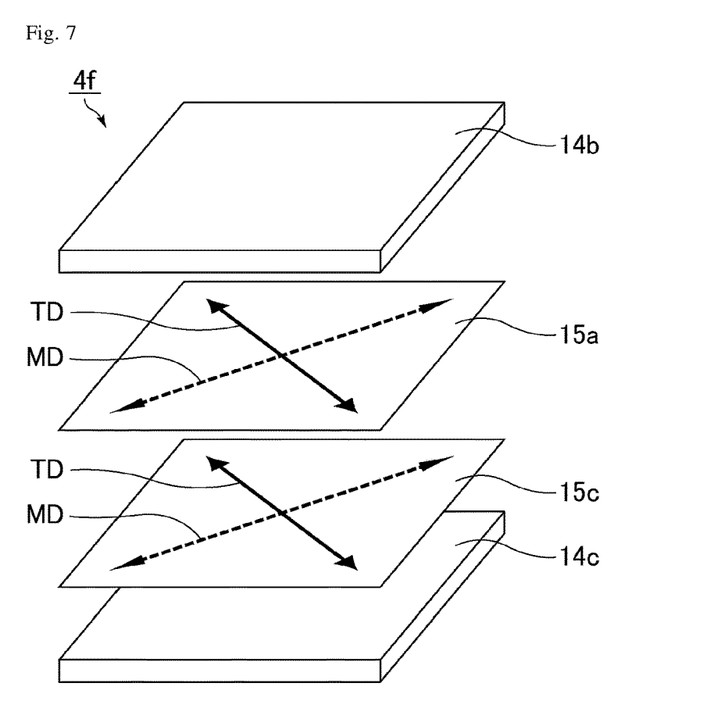
FIG. 7 is a schematic perspective view of a half mirror plate of Example 6.

FIG. 7 is a schematic perspective view of a half mirror plate of Example 6. As shown in FIG. 7, a half mirror plate 4f includes, in the order from the back surface side toward the viewing surface side, a stack of the glass substrate 14c and the reflective polarizer 15c as a warp-suppressing member, the reflective polarizer 15a as a half mirror layer, and the glass substrate 14b as a base material supporting the half mirror layer. The respective members were bonded to each other with an adhesive (trade name: PD-S1, not shown, available from Panac Co., Ltd.) in between. The explanation of the glass substrate 14c and the reflective polarizer 15c has been already made in the above.

The MD and TD of the reflective polarizer 15a and the MD and TD of the reflective polarizer 15c are as shown in FIG. 7, and the respective MDs were made parallel to each other. The angle formed by the MDs of the reflective polarizers 15a and 15c is not particularly limited as long as it is 0° or greater but less than 90°. Here, the MDs of the reflective polarizers are each along the transmission axis. If the angle formed by the MDs of the two reflective polarizers is 90°, the transmission axes of the respective polarizers are perpendicular to each other. Thus, light emitted from the liquid crystal display device 2 cannot be transmitted to the viewing surface side as display light. Accordingly, the angle formed by the MDs of the two reflective polarizers is preferably less than 90°. Furthermore, from the viewpoint of transmitting light emitted from the liquid crystal display device 2 to the viewing surface side with a minimum loss, the angle formed by the MD of the reflective polarizer 15a and the MD of the reflective polarizer 15c is more preferably 0°. The angle formed by the reflection axis of the reflective polarizer 15a and the reflection axis of the reflective polarizer 15c was made 0°. The TDs of the reflective polarizers are each along the reflection axis. In terms of enhancing the reflectance for outside light to improve the display quality in the mirror mode, the angle formed by the TD of the reflective polarizer 15a and the TD of the reflective polarizer 15c is preferably greater than 0°.

In the mirror display of Example 6, a symmetrical structure in which the reflective polarizers 15a and 15c are interposed between the glass substrates 14b and 14c is achieved, thereby perfectly prevents warp of the half mirror plate 4f under heat, and can resultantly prevent distortion of a reflected image in the mirror mode.

Comparative Example 1

Comparative Example 1 relates to a mirror display that includes a liquid crystal display device and a reflective polarizer as a half mirror layer. The difference from Example 1 is that no warp-suppressing member is provided. Since the mirror display of Comparative Example 1 is the same as the mirror display of Example 1 except for the above configuration, the explanation of the same respects is omitted here.

Figure 8:
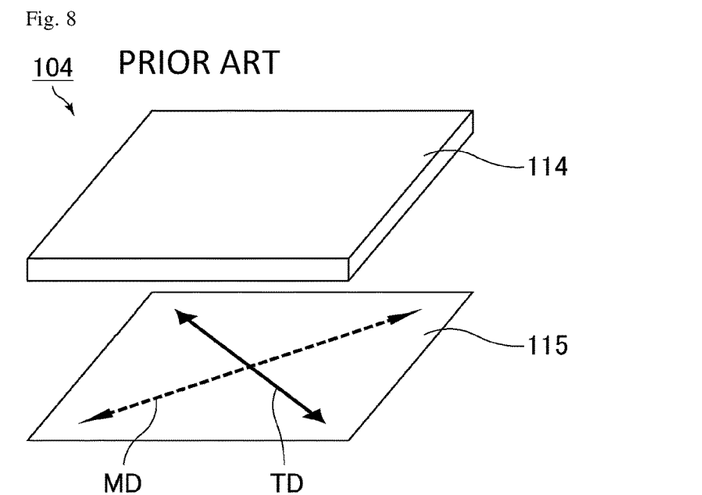
FIG. 8 is a schematic perspective view of a half mirror plate of Comparative Example 1.

FIG. 8 is a schematic perspective view of a half mirror plate of Comparative Example 1. As shown in FIG. 8, a half mirror plate 104 includes, in the order from the back surface side toward the viewing surface side, a reflective polarizer 115 as a half mirror layer and a glass substrate 114 as a base material supporting the half mirror layer. The respective members were bonded to each other with an adhesive (trade name: PD-S1, not shown, available from Panac Co., Ltd.) in between.

For the reflective polarizer 115, a multilayer reflective polarizer (trade name: DBEF, available from Sumitomo 3M Ltd.) made of the same material and having the same thickness and size as the reflective polarizer 15a was used. The MD and TD of the reflective polarizer 115 were as shown in FIG. 8 and in the same arrangement as those of the reflective polarizer 15a.

For the glass substrate 114, a non-alkali glass substrate (trade name: EAGLE XG, available from Corning Incorporated) made of the same material and having the same thickness and size as the glass substrate 14b was used.

The mirror display of Comparative Example 1 has the configuration in which the reflective polarizer 115 is bonded to only one side of the glass substrate 114, and thus fails to suppress warp of the half mirror plate 104 resulting from heat shrinking of the reflective polarizer 115 under heat. Accordingly, distortion of a reflected image in the mirror mode cannot be prevented.

[Evaluation Results]

The measurement results of the amounts of warp of the half mirror plates of Examples 1 to 6 and Comparative Example 1 under heat are summarized in Table 1.

Figure 9:
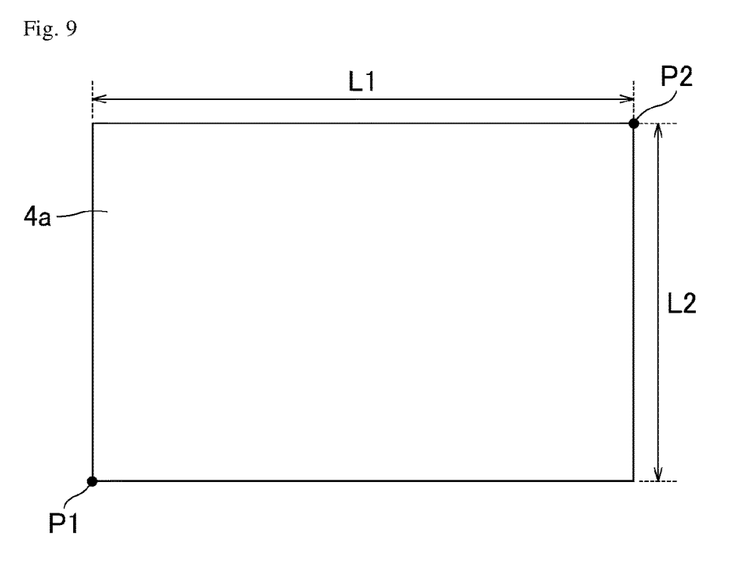
FIG. 9 is a schematic plan view showing measuring points for the amount of warp of a half mirror plate.
Figure 10:
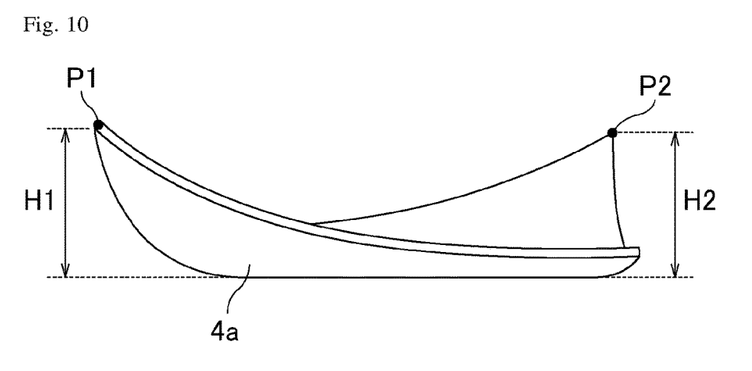
FIG. 10 is a schematic side view of a side of the half mirror plate in FIG. 9.

The method for measuring the amounts of warp is described below referring to FIG. 9 and FIG. 10. FIG. 9 is a schematic plan view showing measuring points for the amount of warp of a half mirror plate. FIG. 10 is a schematic side view of a side of the half mirror plate in FIG. 9. FIG. 9 and FIG. 10 show the case of the half mirror plate 4a of Example 1, and the same shall apply to each example. In FIG. 9, L1 and L2 are the lengths of the respective sides of the half mirror plate, where L1=443 mm and L2=249 mm, as mentioned above.

(1) The half mirror plate of each example was placed on a flat surface with the viewing surface side down.
(2) The amounts of warp (H1, H2) on the two points (P1, P2) shown in FIG. 9 and FIG. 10 were measured with a thickness gauge (trade name: No. 150 MH, available from Niigata Seiki Co., Ltd.), and the average (hereinafter, referred to as Ha (mm)) thereof was calculated.
(3) Subsequently, the half mirror plate of each example was placed in a constant-temperature bath at 85° C. for 250 hours.
(4) The amounts of warp were measured in the same manner as in (2), and the average (hereinafter, referred to as Hb (mm)) thereof was calculated.
(5) The amount of warp H under heat in each example was determined according to H=Hb−Ha (mm).

TABLE 1

| | Amount of warp H (mm) |
|---|---|
| Example 1 | 1.4 |
| Example 2 | 1.2 |
| Example 3 | 0.6 |
| Example 4 | 0.0 |
| Example 5 | 0.0 |
| Example 6 | 0.0 |
| Comparative Example 1 | 2.0 |

As shown in Table 1, the half mirror plates of Examples 1 to 6 each had a smaller amount of warp than the half mirror plate of Comparative Example 1. In addition, the half mirror plates of Examples 4 to 6 each were evaluated to be particularly excellent because no warp under heat was observed. The amount of warp of a half mirror plate under heat is preferably 1.5 mm or less, more preferably 1 mm or less when measured after the half mirror plate was placed in a constant-temperature bath at 85° C. for 250 hours as described in (1) to (5). In contrast, the half mirror plate of Comparative Example 1 was evaluated to have failed to suppress warp under heat compared to the half mirror plates of the examples. This is because the half mirror plate of Comparative Example 1 includes no warp-suppressing member.

[Additional Remarks]

The following are examples of preferred embodiments of the mirror display of the present invention. The respective examples may appropriately be combined with each other within the spirit of the present invention.

In the present invention, the first reflective polarizer and the first base material, which are integrated, are preferably bonded to each other with an adhesive. The respective members may be directly bonded with an adhesive or may be bonded with another member interposed therebetween, unless the effects of the present invention are inhibited.

The warp-suppressing member may include a heat-shrinkable member that shrinks under heat, and the heat-shrinkable member may be bonded to the first base material on the side opposite to the first reflective polarizer. This configuration can effectively suppress warp of the half mirror plate under heat utilizing the effect that the heat-shrinkable member shrinks under heat.

A first direction and a second direction may be substantially parallel to each other, where the first direction is one of a machine direction and a transverse direction of the first reflective polarizer with a higher heat shrinkage, and the second direction is one of a machine direction and a transverse direction of the heat-shrinkable member with a higher heat shrinkage. The heat shrinkage of the heat-shrinkable member in the second direction may be equal to or lower than the heat shrinkage of the first reflective polarizer in the first direction. Arranging the first reflective polarizer and the heat-shrinkable member such that the directions in which the respective members each have a higher heat shrinkage are substantially parallel to each other can more effectively suppress warp of the half mirror plate under heat.

The warp-suppressing member may include a second reflective polarizer, and the second reflective polarizer may be bonded to the first base material on the side opposite to the first reflective polarizer. This configuration can effectively suppress warp of the half mirror plate under heat utilizing the effect that the second reflective polarizer shrinks under heat. Furthermore, the first reflective polarizer may be made of the same material and may have the same thickness as the second reflective polarizer. This configuration achieves the same heat shrinkage between the respective reflective polarizers and thus can more effectively suppress warp of the half mirror plate under heat.

The first reflective polarizer may have a machine direction substantially parallel to a machine direction of the second reflective polarizer. This configuration allows the first and second reflective polarizers to pull the first base material with identical strengths, and thus can perfectly prevent warp of the half mirror plate under heat.

The warp-suppressing member may include a second base material, and the second base material may be bonded to the first reflective polarizer on the side opposite to the first base material. This configuration can effectively suppress warp of the half mirror plate under heat utilizing the configuration in which the first reflective polarizer is interposed between the first and second base materials. Furthermore, the first base material may be made of the same material and may have the same thickness as the second base material. This achieves a symmetrical structure in which the first reflective polarizer is interposed between the first and second base materials, and thus can perfectly prevent warp of the half mirror plate under heat.

The warp-suppressing member may include a second reflective polarizer and a second base material, and the second reflective polarizer and the second base material may be bonded to the first reflective polarizer on the side opposite to the first base material in the stated order. This configuration can effectively suppress warp of the half mirror plate under heat utilizing the configuration in which the first and second reflective polarizers are interposed between the first and second base materials.

The first reflective polarizer may be made of the same material and may have the same thickness as the second reflective polarizer. The first reflective polarizer may have a machine direction substantially parallel to a machine direction of the second reflective polarizer. The first base material may be made of the same material and may have the same thickness as the second base material. These features allow a symmetrical structure in which the first and second reflective polarizers are interposed between the first and second base materials, and thus can perfectly prevent warp of the half mirror plate under heat.

The display device may be a liquid crystal display device. This enables suitable use of the present invention when a liquid crystal display device is used as the display device. In addition, combination use with a reflective polarizer can achieve both the visibility of the display image in the display mode and the visibility of a reflected image in the mirror mode.

REFERENCE SIGNS LIST

1: mirror display
2: liquid crystal display device
3: air layer
4a, 4b, 4c, 4d, 4e, 4f, 104: half mirror plate
5: backlight unit
6: LED
7: diffuser
8: liquid crystal display panel
9a, 9b: absorptive polarizer
10: thin film transistor array substrate
11: liquid crystal layer
12: color filter substrate
13R, 13G, 13B: color filter layer
14a, 14b, 14c, 114: glass substrate
15a, 15b, 15c, 115: reflective polarizer
16a, 16b: heat-shrinkable member

The invention claimed is:

1. A mirror display comprising:
a half mirror plate that includes a first reflective polarizer and a first base material;
a liquid crystal display device that includes a liquid crystal display panel; and
a warp-suppressing member that suppresses shrinking of the first reflective polarizer under heat,
the first reflective polarizer and the first base material being integrated,
the liquid crystal display panel including, in order from a back surface side toward a viewing surface side, a first absorptive polarizer, a liquid crystal layer, and a second absorptive polarizer,
the liquid crystal display device being disposed on the back surface side of the half mirror plate,
a transmission axis of the first reflective polarizer and a transmission axis of the second absorptive polarizer being parallel to each other, and
the warp-suppressing member being disposed closer to the viewing surface side than to the first reflective polarizer.

2. The mirror display according to claim 1,
wherein the warp-suppressing member includes a heat-shrinkable member that shrinks under heat, and
the heat-shrinkable member is bonded to the first base material on a side opposite to the first reflective polarizer.

3. The mirror display according to claim 2,
wherein a first direction and a second direction are substantially parallel to each other, where the first direction is one of a machine direction and a transverse direction of the first reflective polarizer with a higher heat shrinkage, and the second direction is one of a machine direction and a transverse direction of the heat-shrinkable member with a higher heat shrinkage.

4. The mirror display according to claim 3,
wherein the heat shrinkage of the heat-shrinkable member in the second direction is equal to or lower than the heat shrinkage of the first reflective polarizer in the first direction.

5. The mirror display according to claim 1,
wherein the warp-suppressing member includes a second reflective polarizer, and
the second reflective polarizer is bonded to the first base material on the side opposite to the first reflective polarizer.

6. The mirror display according to claim 5,
wherein the first reflective polarizer is made of the same material and has the same thickness as the second reflective polarizer.

7. The mirror display according to claim 5,
wherein the first reflective polarizer has a machine direction substantially parallel to a machine direction of the second reflective polarizer.

8. The mirror display according to claim 5,
wherein an angle defined by a reflection axis of the first reflective polarizer and a reflection axis of the second reflective polarizer is 0°.

* * * * *